United States Patent [19]

Warwick

[11] 3,995,597
[45] Dec. 7, 1976

[54] FLEA POWDER DISPENSER
[76] Inventor: Ronald E. Warwick, P.O. Box 1149, Cedar Lake, Ind. 46303
[22] Filed: Mar. 31, 1975
[21] Appl. No.: 563,309
[52] U.S. Cl. .................................. 119/86; 132/112
[51] Int. Cl.² ........................................ A01K 13/00
[58] Field of Search .......... 401/208, 218; 132/112; 119/83, 85, 86, 93

[56] References Cited
UNITED STATES PATENTS

| | | | |
|---|---|---|---|
| 1,997,492 | 4/1935 | Lirio | 119/86 |
| 2,681,039 | 6/1954 | Springborn | 132/112 X |
| 2,865,383 | 12/1958 | Kaley | 132/112 X |
| 3,874,330 | 4/1975 | Zoccolini | 401/208 X |

*Primary Examiner*—Stanley H. Tollberg
*Attorney, Agent, or Firm*—Wegner, Stellman, McCord, Wiles & Wood

[57] ABSTRACT

A flea powder dispenser having a cylindrical powder holder with molded teeth and incorporating a snapped-in-place knurled dispensing roller.

4 Claims, 4 Drawing Figures

FLEA POWDER DISPENSER

The invention concerns a Flea Powder Dispenser comprised of a two piece unit used in conjunction with the storage and application of flea powder.

The unit has a cylindrical body with molded-in teeth the purpose of which is to separate the animal's hair thus allowing the powder to be dispensed via the knurled cylindrical roller directly to the animal's skin.

The flea powder dispenser is quite advantageous from the standpoint of eliminating the mess usually arising from the application of flea powder. The unit is also adaptable to cylindrical shaped flea powder containers which after opening can be slipped into the top of the dispenser and held in place by means of a running friction fit.

An embodiment of the invention is illustrated in the drawings, in which.

Figure 1:
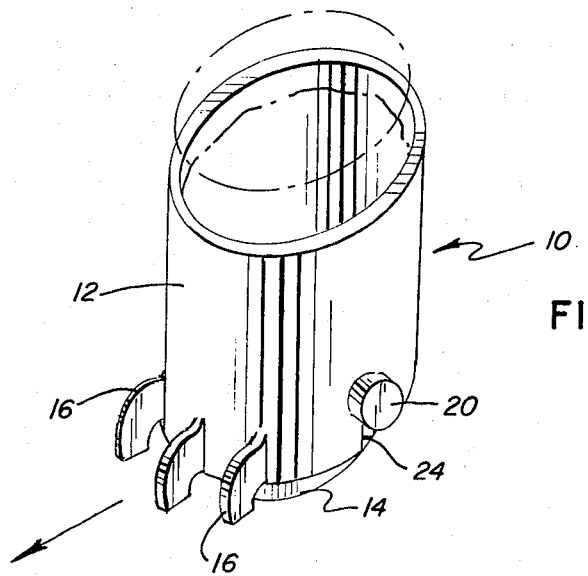
FIG. 1 is a perspective view of the flea powder dispenser according to the invention.

The Flea Powder Dispenser 10 illustrated in the drawings has only two individual parts, namely, the powder holder 12 and the powder dispensing roller 14.

Figure 2:
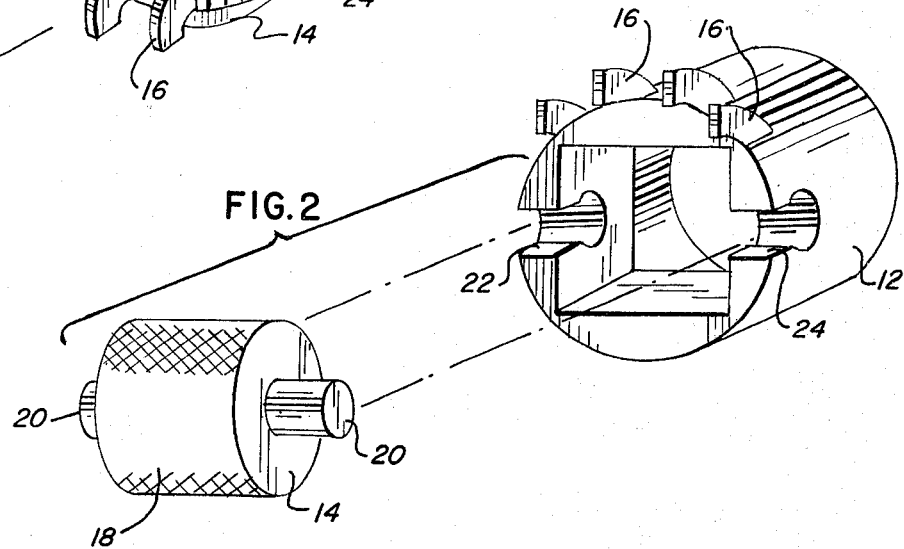
FIG. 2 is an exploded perspective view of the housing and of the roller.
Figure 3:
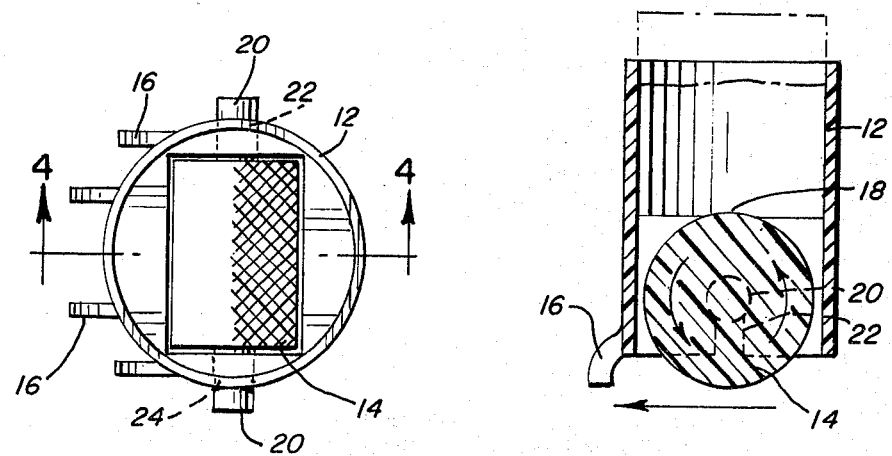
FIG. 3 is a plan view of the flea powder dispenser of FIG. 1.
Figure 4:
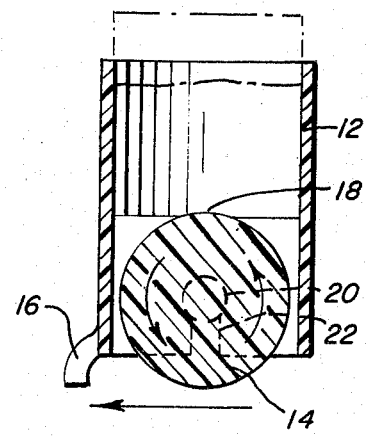
FIG. 4 is a cross-sectional view taken along the line 4—4 of FIG. 3.

The flea powder holder 12 is of simple molded plastic construction incorporating four teeth 16 to comb thru the animal's hair thus separating the hair as the unit travels over the animals body with the roller 14 rotating to dispense the flea powder. As shown in FIG. 2, the holder 12 has a rectangularly shaped opening in the lower portion thereof in which the roller 14 nests and turns. The outer ends of the teeth 16 lie in an arcuate curve forward of the holder 12.

The dispensing roller 14 is of nylon construction with a medium knurl 18 on the entire circumference. Its ends 20 are of a much smaller diameter than the knurled roller 14 thus allowing the roller 14 to be snapped into place because of the keyhole arrangement 22, 24 which are 180° apart and are on a line perpendicular to the axes of the four comb teeth 16 on the holder 12.

I claim:

1. In a medicament applicator having a cylindrical housing open at the top and at the bottom thereof, a plurality of teeth formed integrally with the bottom edge portion of the outer cylindrical wall of said housing with the outer ends of said teeth lying in an arcuate curve, said teeth projecting forwardly of said wall and lying substantially parallel to each other and in position on the housing to comb through hair on a hairy surface as the cylinder is moved over said hairy surface with the axis of the cylindrical housing being disposed perpendicular to the plane of said hairy surface, a solid roller having mounting means on each end thereof and being rotatably mounted in the open bottom of the housing with the axis of the roller lying perpendicular to the axis of the teeth on the housing, and a portion of said roller projecting below the plane of the bottom of the housing whereby moving said housing over said hairy surface will rotate the roller to dispense medicament from within said housing onto said hairy surface.

2. In a medicament applicator as claimed in claim 1 wherein said roller is cylindrical in shape and has a knurled outer surface which knurling picks up medicament in the housing and dispenses it on the surface over which the roller is traversed.

3. In a medicament applicator as claimed in claim 1 wherein said roller has reduced diameter ends which are rotatably seated in aligned keyhole arrangements formed in the cylindrical wall of said housing.

4. In a medicament applicator as claimed in claim 1 wherein the upper end of the housing is open for receiving a supply of medicament to be dispensed.

* * * * *